(12) United States Patent
Shimizu et al.

(10) Patent No.: US 10,591,370 B2
(45) Date of Patent: Mar. 17, 2020

(54) DYNAMOMETER DEVICE AND METHOD FOR ASSEMBLING SAME

(71) Applicant: MEIDENSHA CORPORATION, Tokyo (JP)

(72) Inventors: Takahiro Shimizu, Ashikaga (JP); Shigeo Watanabe, Fukaya (JP)

(73) Assignee: MEIDENSHA CORPORATION, Tokyo (JP)

(*) Notice: Subject to any disclaimer, the term of this patent is extended or adjusted under 35 U.S.C. 154(b) by 0 days.

(21) Appl. No.: 16/309,312

(22) PCT Filed: Feb. 27, 2017

(86) PCT No.: PCT/JP2017/007343
§ 371 (c)(1),
(2) Date: Dec. 12, 2018

(87) PCT Pub. No.: WO2017/217020
PCT Pub. Date: Dec. 21, 2017

(65) Prior Publication Data
US 2019/0250052 A1   Aug. 15, 2019

(30) Foreign Application Priority Data
Jun. 15, 2016  (JP) ................. 2016-118430

(51) Int. Cl.
 *G01L 3/00*  (2006.01)
 *G01L 3/16*  (2006.01)
 *G01M 15/02*  (2006.01)
 *G01M 17/007*  (2006.01)

(52) U.S. Cl.
 CPC .............. *G01L 3/16* (2013.01); *G01M 15/02* (2013.01); *G01M 17/007* (2013.01)

(58) Field of Classification Search
 CPC .......... G01L 3/16; G01L 15/02; G01L 17/007
 USPC ...................................... 73/862.09; 7/862.09
 See application file for complete search history.

(56) References Cited

U.S. PATENT DOCUMENTS

| | | | |
|---|---|---|---|
| 4,899,595 A | 2/1990 | Warsaw | |
| 2002/0134460 A1* | 9/2002 | Sogliani | B67C 3/02 141/144 |
| 2003/0223890 A1* | 12/2003 | Lo | G01L 3/20 417/313 |
| 2010/0154395 A1* | 6/2010 | Frick | F01K 27/02 60/320 |
| 2011/0252877 A1 | 10/2011 | Barnes | |
| 2017/0108388 A1* | 4/2017 | Warsaw | G01L 3/20 |

FOREIGN PATENT DOCUMENTS

| | | |
|---|---|---|
| JP | 45-020878 Y1 | 8/1970 |
| JP | 54-102179 A | 8/1979 |
| JP | 2001-141579 A | 5/2001 |
| JP | 2008-275431 A | 11/2008 |

* cited by examiner

*Primary Examiner* — Max H Noori
(74) *Attorney, Agent, or Firm* — Foley & Lardner LLP

(57) ABSTRACT

A dynamometer (5) in a dynamometer device (1) is assembled on the top of a dynamometer-side bed (6), and the dynamometer-side bed (6) is removably attached to a tank-side bed (15) located on the top part of a bed tank (3). Consequently, at the time of the disassembling of the dynamometer device (1) for maintenance or the like, it is possible to easily separate a dynamo body (4) and the bed tank (3) from one another by simply taking down the dynamometer-side bed (6) from the tank-side bed (15).

15 Claims, 8 Drawing Sheets

DYNAMOMETER DEVICE AND METHOD FOR ASSEMBLING SAME

TECHNICAL FIELD

The present invention relates to a dynamometer device in which a dynamometer is placed on a tank.

BACKGROUND TECHNOLOGY

In a patent document 1, a dynamometer device for performing performance evaluation and a durability test by using, for example, an engine as a test body has been disclosed. In this dynamometer device, a dynamometer is assembled on the top of a tank for storing a cooling medium. A plurality of components composing the dynamometer are individually attached to a bed on the top of the tank.

However, in the dynamometer device of the patent document 1, for example, at the time of disassembling for maintenance, it is necessary to remove a plurality of the components of the dynamometer from the bed of the tank individually, and there is possibility that the number of the steps and the time accompanied with the disassembling of the dynamometer device increases.

Therefore, an object of the present invention is to provide a dynamometer device in which disassembling of the dynamometer device and assembling thereafter can be easily performed.

PRIOR ART DOCUMENT

Patent Document

Patent Document 1: Japanese Patent Application Publication 2008-275431

SUMMARY OF THE INVENTION

A dynamometer device of the present invention includes: a dynamometer assembled on a flat first bed; and a tank having a flat second bed at a top part thereof, and storing a cooling medium inside thereof. In the dynamometer device, the first bed is placed on the second bed, and is removably attached to the second bed.

In addition, a method for assembling a dynamometer device of the present invention includes the steps of: assembling a dynamometer on a flat first bed; assembling a tank having a flat second bed located at a top part thereof and storing a cooling medium inside thereof; and placing the first bed on the second bed and removably fixing the beds to each other.

Consequently, it is possible to disassemble the first bed substantially integrated with the dynamometer by removing it from the second bed of the tank and to reassemble it.

According to the present invention, at the time of the disassembling of the dynamometer device, the dynamometer can be easily removed from the tank because it is only necessary to take down the first bed on a dynamometer side from the second bed on a tank side.

MODE FOR IMPLEMENTING THE INVENTION

In the following, one embodiment of the present invention will be explained with reference to the drawings.

Figure 1:
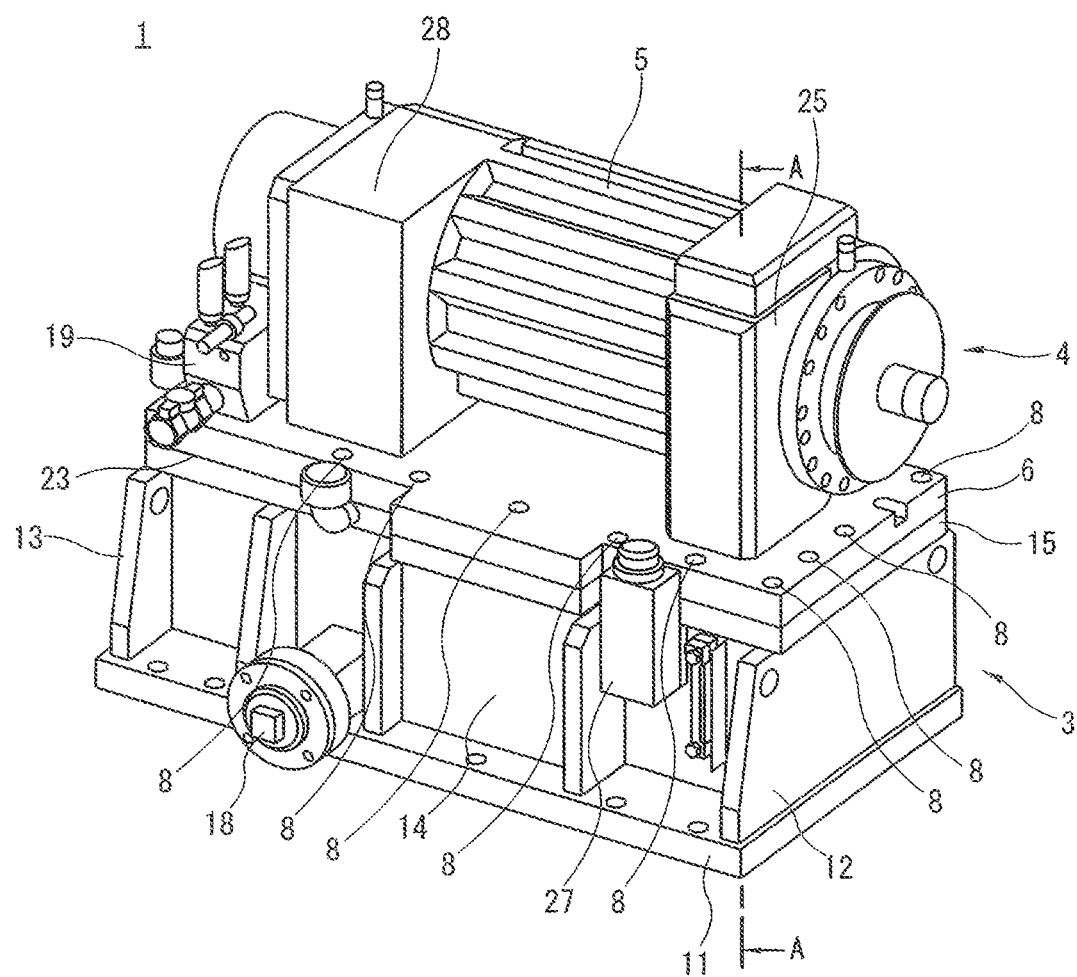
FIG. 1 is a perspective view of a dynamometer device in one embodiment.

In FIG. 1, an oil-cooled dynamometer device 1 in one embodiment of the present invention is shown. The dynamometer device 1 is used to perform performance evaluation and a durability test by using, for example, an engine, a transmission or the like of a vehicle as a test body.

The dynamometer device 1 is equipped with a bed tank 3 for storing a cooling oil 2 as a cooling medium and a dynamo body 4 provided on this bed tank 3.

Figure 2:
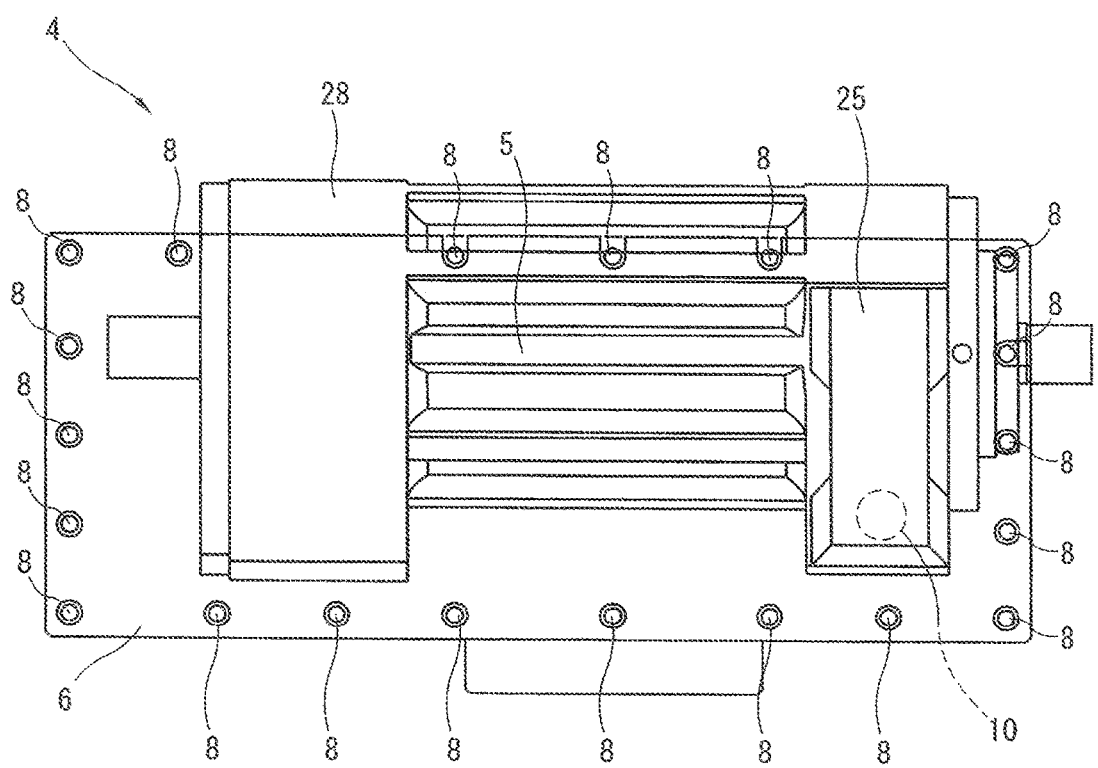
FIG. 2 is a top view of a dynamo body.

The dynamo body 4 is equipped with a long narrow dynamometer 5 formed in a substantially cylindrical shape and a plate-shaped dynamometer-side bed 6 on which this dynamometer 5 is placed. The dynamometer 5 accommodates a rotor, a stator, coils, permanent magnets and the like which are not shown in the drawings. In addition, an auxiliary machine terminal box 28 for accommodating terminals for an auxiliary machine which is not shown in the drawings is provided on the outer periphery of the dynamometer 5. The dynamometer-side bed 6 is formed in a flat bed shape having sufficient strength by using steel material, and, as shown in FIG. 1, has a long narrow external shape along the axial direction of the dynamometer 5. As shown in FIG. 2, the dynamometer-side bed 6 is provided with, at the peripheral edge part thereof, a plurality of through holes 8 through which bolts 7 pass (FIG. 8(a)). The through holes 8 each have a step (FIG. 8(a)) such that the heads of the bolts 7 engage with the through holes 8 in the insides of the through holes 8. Moreover, also as shown in FIG. 2, the dynamometer-side bed 6 is provided with a through hole for an oil discharge pipe into which the after-mentioned oil discharge pipe 9 is inserted.

The dynamometer 5 is assembled on the dynamometer-side bed 6 in a posture in which a rotation shaft 5a (FIG. 5) of the dynamometer 5 becomes parallel to the dynamometer-side bed 6.

As shown in FIG. 1, the bed tank 3 is equipped with a bottom wall 11, a front wall 12 and a rear wall 13 vertically rising up from the bottom wall 11, two side walls 14, 14 (in FIG. 1, only one of the side walls 14 is shown) connecting the front wall 12 with the rear wall 13, and with a tank-side bed located at the top part of the bed tank 3 and supported by the front wall 12, the rear wall 13 and the two side walls 14, 14.

Figure 3:
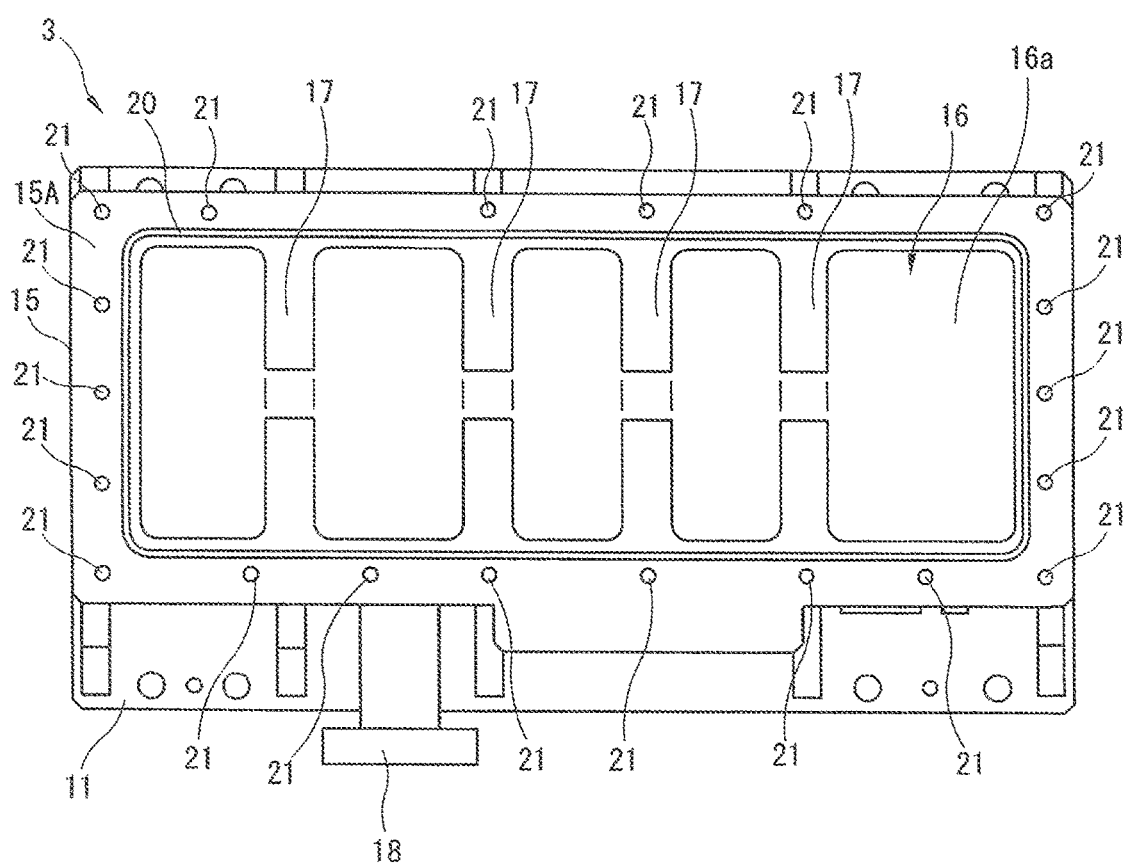
FIG. 3 is a top view of a bed tank.

As shown in FIG. 3, the inside of the bed tank 3 is a cooling oil reservoir 16 for storing the cooling oil 2. As shown in FIG. 3, four reinforcing walls 17 connecting the side walls 14, 14 to each other are provided between the two side walls 14, 14. The inside of the cooling oil reservoir 16 is partitioned by the four reinforcing walls 17, and adjacent partitions in the cooling oil reservoir 16 communicate with each other. One of the side walls 14 (the side wall 14 on the front side of FIG. 1) is provided with a cooling oil injection port 27 used for injecting the cooling oil 2 into the cooling oil reservoir 16 after the assembling of the dynamometer device 1 and with an oil outlet 18 used for taking out the cooling oil 2 from the cooling oil reservoir 16. This oil outlet 18 is connected to a manifold 19 disposed on one end side (left side of FIG. 4) in the axial direction of the dynamometer 5 through a pump unit which is not shown in the drawings.

The tank-side bed 15 is also formed in a flat bed shape by using steel material, and has an external shape corresponding to the dynamometer-side bed 6. The middle part of the tank-side bed 15 has an opening part 16a having a substantially rectangular shape so as to open the upper surface side of the cooling oil reservoir 16. The tank-side bed 15 is therefore formed in a continuous rectangular flange shape around the opening part 16a. An upper surface 15A of the tank-side bed 15 is formed in a smooth flat surface. As shown in FIG. 3, the upper surface 15A is formed with a continuous seal groove 20 having a substantially rectangular shape so as to surround the opening part 16a. The seal groove 20 is fitted with a continuous seal formed in a frame shape which is made of, for example, a rubber, seal which is not shown in the drawings. Moreover, as shown in FIG. 3, the tank-side bed 15 is provided with screw holes 21 with which the bolts 7 are screwed, at positions corresponding to the respective through holes 8 of the dynamometer-side bed 6.

The flat dynamometer-side bed 6 is placed on the flat tank-side bed formed as above, and is removably fixed thereto.

The dynamometer-side bed 6 has an external shape corresponding to the tank-side bed 15, and by being placed on the tank-side bed 15, the dynamometer-side 6 functions as a cover for covering the opening part 16a of the tank-side bed 15. Therefore, when the dynamometer-side bed 6 is taken down from the tank-side bed 15, the opening part 16a is opened, and thereby the cleaning of the cooling oil reservoir 16 becomes easy.

Here, the dynamometer-side bed 6 and the tank-side bed 15 respectively correspond to "first bed" and "second bed" described in the scope of the claims.

Figure 5:
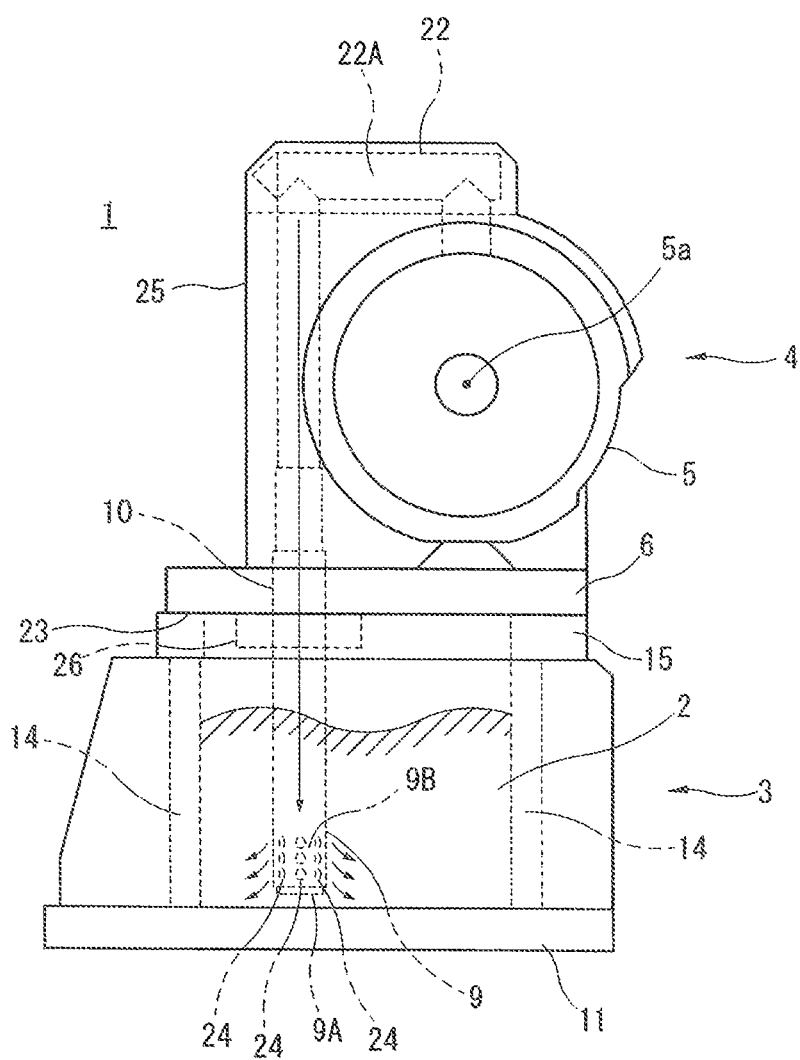
FIG. 5 is a front view of the dynamometer device in one embodiment.
Figure 7:
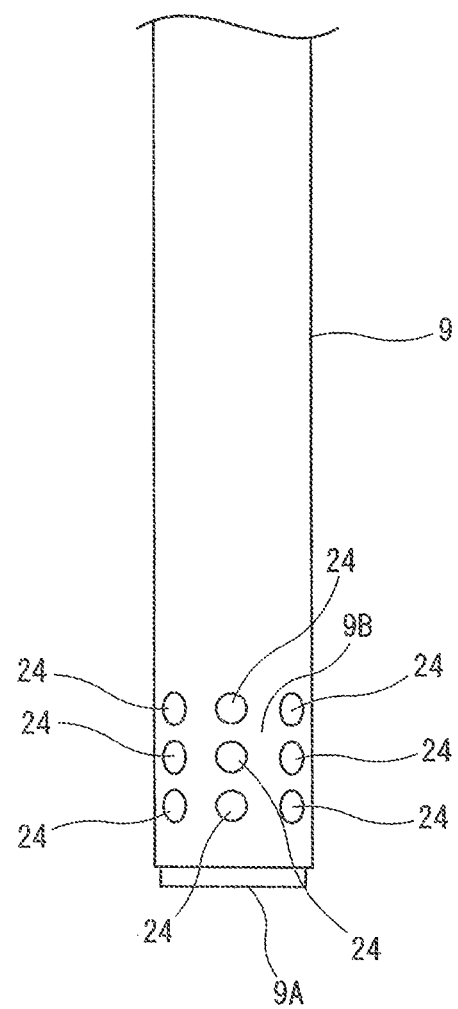
FIG. 7 is an explanatory view of the oil discharge pipe.

In addition, in the end portion of the dynamometer 5 on the opposite side to the manifold 19, the oil discharge pipe 9 for returning the cooling oil 2 to the bed tank 3 is routed from the upper part of the dynamometer 5. That is, as shown in FIG. 5, a long narrow oil discharge block 22 equipped with a flow passage 22A projects to a side of the dynamometer 5 from the upper part of the cylindrical dynamometer 5, and the oil discharge pipe 9 communicating with the flow passage 22A extends into the bed tank 3 through the oil discharge pipe through hole 10 of the dynamometer-side bed 6. The oil discharge pipe 9 is disposed vertically and linearly. In a position (position along a left-right direction of FIG. 5) apart from the rotation shaft 5a of the dynamometer 5 to a side thereof by a length substantially corresponding to the radius of the dynamometer 5, the oil discharge pipe 9 passes through an interface 23 between the dynamometer-side bed 6 and the tank-side bed 15, and extends to the inside of the bed tank 3. The oil discharge block 22 is configured so as to gather the air from the dynamometer 5. The oil discharge pipe 9 is formed in a cylindrical shape in which a distal end surface 9A is closed (the end surface of the oil discharge pipe 9 facing the bottom wall 11 in FIG. 5), and, as shown in FIG. 7, a plurality of oil discharge holes 24 for discharging the cooling oil 2 in the radial direction of the oil discharge pipe 9 are provided on the outer peripheral surface of a distal end part 9B of the oil discharge pipe 9. In the present embodiment, each of the oil discharge holes 24 has a circular shape in cross-section. The oil discharge pipe 9 is formed to have a sufficient length such that the distal end surface 9A is located at a position close to the bottom surface of the cooling oil reservoir 16, and when a specified amount of the cooling oil 2 is filled in the bed tank 3, the oil discharge holes 24 are located inside the cooling oil 2. That is, when a specified amount of the cooling oil 2 is filled, the distal end part 9B of the oil discharge pipe 9 is located inside the cooling oil 2 in the bed tank 3, and the cooling oil 2 is radially discharged from the oil discharge holes 24. The oil discharge pipe 9 and the oil discharge block 22 are accommodated in a case 25 extending in a rectangular shape from the outer peripheral part of the cylindrical dynamometer 5.

Figure 6:
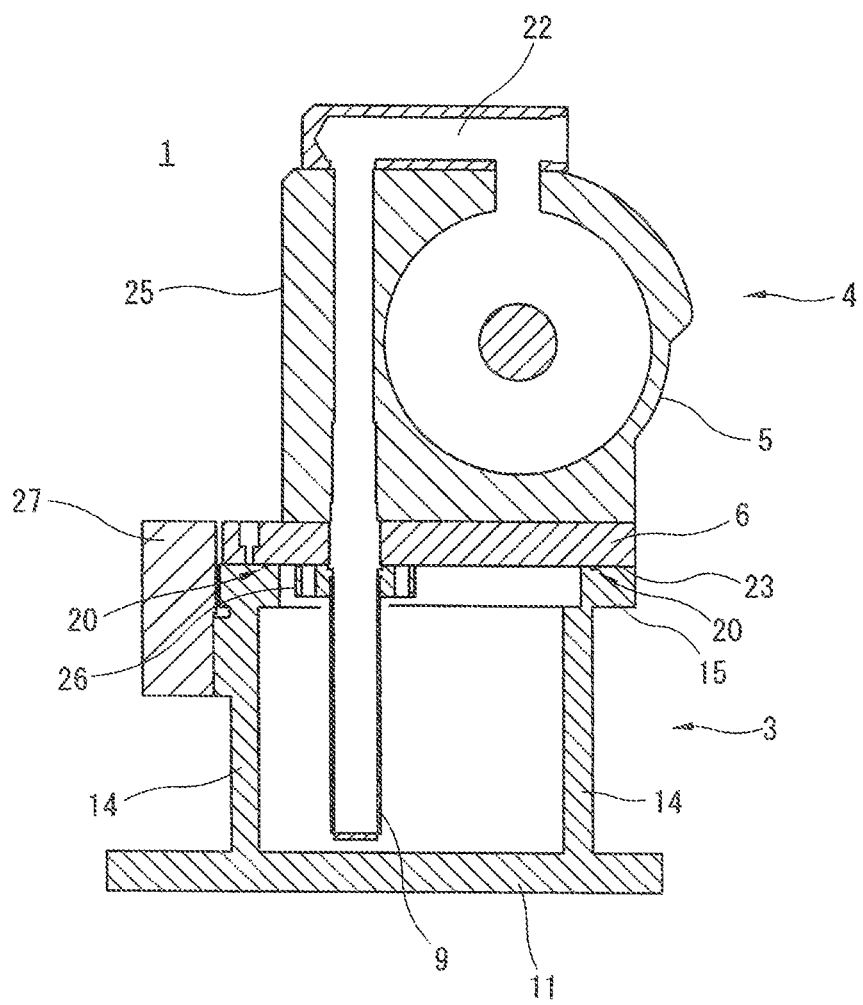
FIG. 6 is a sectional view of the dynamo body, the bed tank and an oil discharge pipe taken along an A-A line of FIG. 1.

In addition, as shown in FIG. 6, the oil discharge pipe 9 is fixed to the dynamometer-side bed 6 by an oil discharge flange 26 provided on the lower surface side of the dynamometer-side bed 6 and a bolt which is not shown in the drawings.

Figure 4:
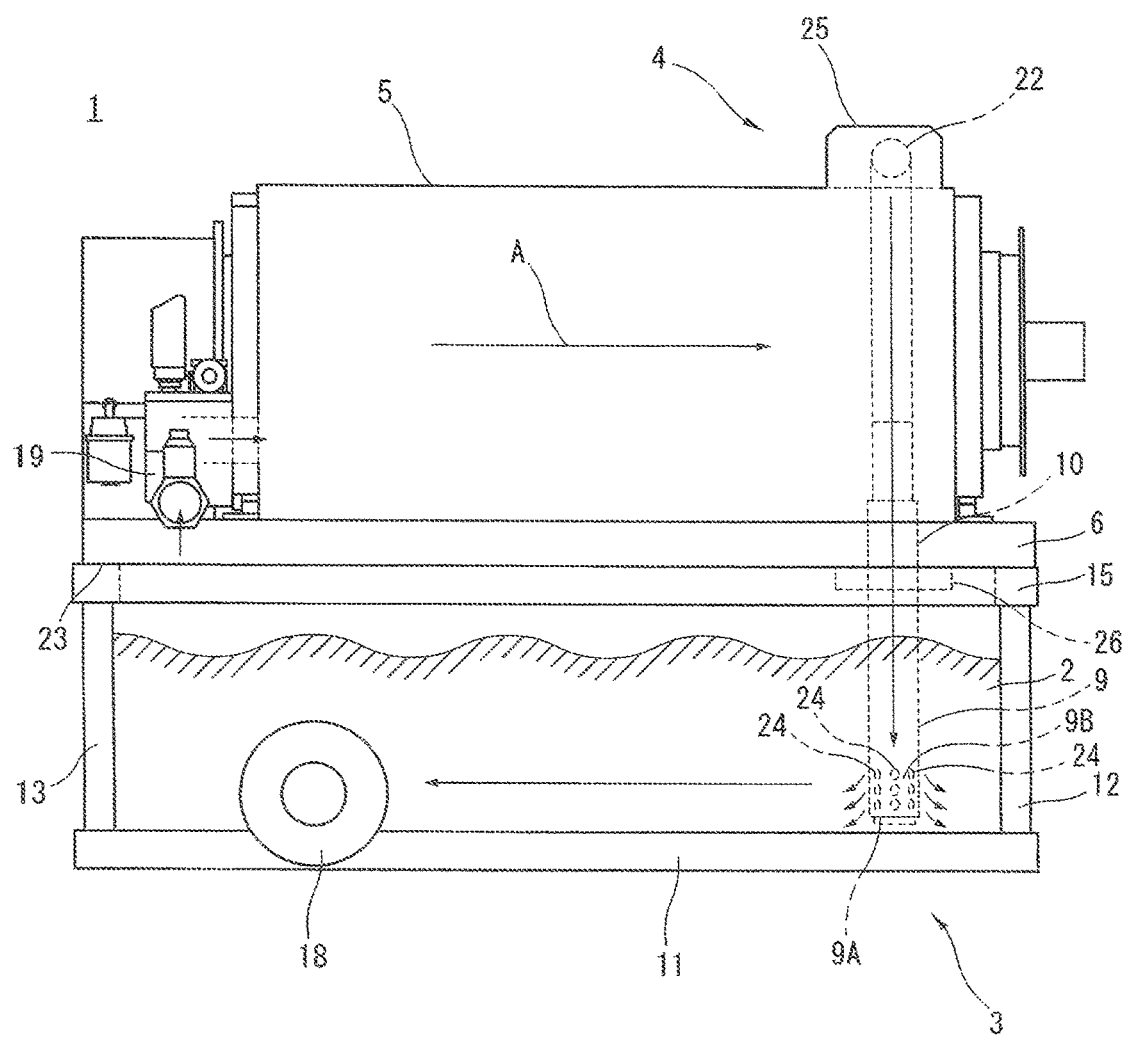
FIG. 4 is a side view of the dynamometer device in one embodiment.

Next, with reference to FIG. 4 and FIG. 5, the flow (shown by an arrow in FIG. 4 and FIG. 5) of the cooling oil 2 in the dynamometer device 1 will be explained. As shown in FIG. 4, the cooling oil 2 taken out from the oil outlet 18 flows into the dynamometer 5 through the manifold 19 by driving a pump unit which is not shown in the drawings. As shown in FIG. 4, the cooling oil 2 flows inside the dynamometer 5 along an axial direction A, and thereby coils, permanent magnets and the like which are not shown in the drawings are cooled. As shown in FIG. 5, in the end portion of the dynamometer 5 on the opposite side to the manifold 19, the cooling oil 2 of which temperature becomes high by cooling the coils, the permanent magnets and the like flows into the oil discharge pipe 9 from the upper part of the dynamometer 5 through the flow passage 22A of the oil discharge block 22. After that, the cooling oil 2 flows downward, and is discharged to the cooling oil reservoir 16 in the bed tank 3 through a plurality of the oil discharge holes 24 in the distal end part 9B of the oil discharge pipe 9.

Next, with reference to FIG. 8, an assembling method for the dynamometer device 1 will be explained.

Figure 8A:
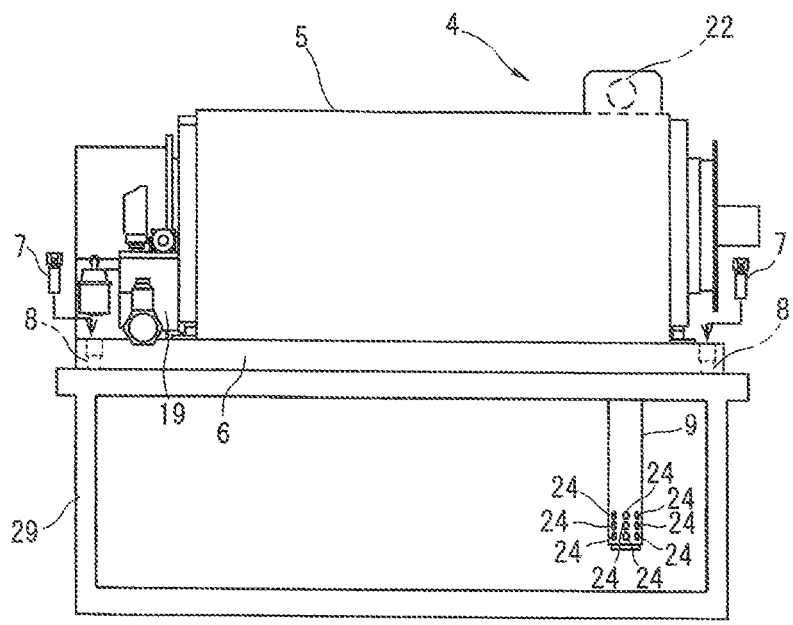
FIG. 8 is an explanatory view showing assembling steps of the dynamometer device.

In an assembling step of the dynamo body 4 shown in FIG. 8(a), in a state in which the dynamometer-side bed 6 is set on a workbench 29, the dynamometer 5 is assembled on the top of the dynamometer-side bed 6.

At the time of the assembling, the oil discharge pipe 9, the manifold 19, the case 25 and the auxiliary machine terminal box 28 are properly attached to the dynamometer 5 and the dynamometer-side bed 6. The attachment of the oil discharge pipe 9 is performed by attaching the oil discharge pipe 9 to the dynamometer 5, after the oil discharge pipe 9 is inserted into the oil discharge pipe through hole 10 of the dynamometer-side bed 6. After the attachment of the oil discharge pipe 9, as shown in FIG. 8(a), the oil discharge pipe 9 becomes a state of projecting downward from the lower surface of the dynamometer-side bed 6. In this way, the dynamo body 4 is assembled into a state in which all equipment needed for the dynamometer 5 is integrated with the dynamometer-side bed 6.

Figure 8B:
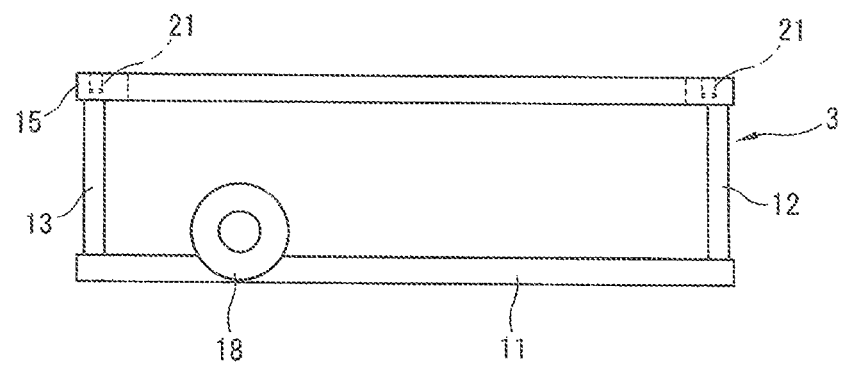

In an assembling step for the bed tank 3 shown in FIG. 8(b), the bed tank 3 is assembled with the bottom wall 11, the front wall 12, the rear wall 13 and the two side walls 14, 14 as a main body by attaching the tank-side bed 15 to the top part of the bed tank 3. Moreover, the oil outlet 18 and the cooling oil injection port 27 are attached to one of the side walls 14.

Figure 8C:
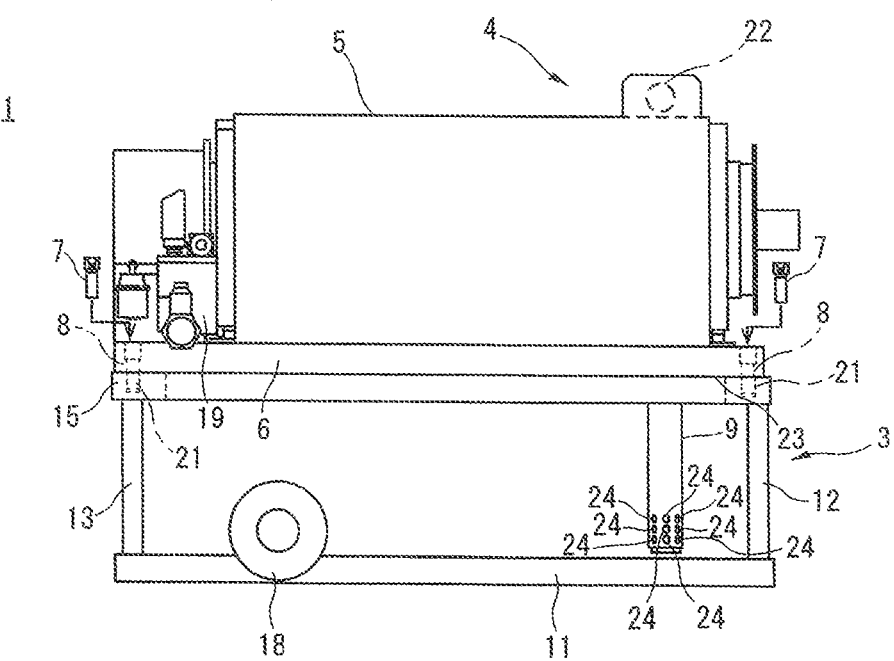

As shown in FIG. 8(c), the dynamometer-side bed 6 is set on the tank-side bed 15, and both of them are fixed to each other by the bolts 7. This fixing is performed after a plurality of the through holes 8 of the dynamometer-side bed 6 are positioned to the corresponding screw holes 21 of the tank-side bed 15 by, for example, visual conformation. In addition, locating pins and locating holes which are not shown in the drawings may be provided for positioning them. In a state in which the beds 6 and 15 are fixed to each other, the dynamometer-side bed 6 comes in contact with the tank-side bed 15 in the interface 23, and the interface 23 is sealed by a seal attached to the seal groove 20 (FIG. 6), which is not shown in the drawings.

In the dynamometer device 1 assembled in this way, the stacked dynamometer-side bed 6 and tank-side bed 15 become substantially one bed. In addition, the dynamometer 5 is placed on the dynamometer-side bed 6 in a posture in which the rotation shaft 5a of the dynamometer 5 becomes parallel to the interface 23.

As the above, in the present embodiment, the dynamometer-side bed 6 which is substantially integrated with the dynamometer 5 and a plurality of components accompanying thereto is removably fixed to the tank-side bed of the bed tank 3. Therefore, for example, when the dynamometer device 1 is disassembled at the time of the maintenance of the cooling oil reservoir 16, it is not necessary to individually remove the dynamometer 5, the oil discharge pipe 9, the manifold 19, the case 25 and the auxiliary machine terminal box 28 from the tank-side bed 15 of the bed tank 3, and thereby it is possible to easily separate the dynamo body 4 and the bed tank 3 from one another by simply lowering the dynamometer-side bed 6 from the tank-side bed 15. Consequently, the number of the steps and the time accompanied with the disassembling of the dynamometer device 1 is reduced. Similarly, the number of the steps and the time accompanied with the assembling of the dynamometer device 1 after the disassembling is reduced. Moreover, since, at the time of the assembling of the dynamometer device 1, the dynamometer-side bed 6 is placed on the tank-side bed 15 and the both of the beds 6 and 15 are simply connected to each other, there is no reduction in accuracy associated with the disassembling and the reassembling.

The invention claimed is:

1. A dynamometer device, comprising:
    a dynamometer assembled on a flat first bed; and
    a tank including a flat second bed at a top part thereof, and storing a cooling medium inside thereof,
    wherein the first bed is placed on the second bed, and is removably attached to the second bed.

2. The dynamometer device according to claim 1, wherein the second bed is provided with an opening part that opens an upper surface side of a cooling medium reservoir inside the tank, and the opening part is covered with the first bed.

3. The dynamometer device according to claim 2, wherein the second bed is formed with, on an upper surface thereof, a seal groove surrounding the opening part, and the seal groove is fitted with a seal.

4. A method for assembling a dynamometer device, comprising the steps of:
    assembling a dynamometer on a flat first bed;
    assembling a tank including a flat second bed located at a top part thereof and storing a cooling medium inside thereof; and
    placing the first bed on the second bed and removably fixing the beds to each other.

5. The method according to claim 4, wherein the first bed is removably fixed to the second bed through a plurality of fasteners that engage a first plurality of holes along a peripheral edge of the first bed and a second plurality of holes along a peripheral edge of the second bed.

6. The method according to claim 4, wherein the second bed is provided with an opening part that opens an upper surface side of a cooling medium reservoir inside the tank, and the opening part is covered with the first bed.

7. The dynamometer device according to claim 1, further comprising an oil discharge pipe extending through an opening in the first bed.

8. The dynamometer device according to claim 7, wherein the oil discharge pipe routes inside the dynamometer through the first bed.

9. The dynamometer device according to claim 8, wherein the oil discharge pipe includes:
    an upper portion routing through an upper part of the dynamometer; and
    a lower portion routing from an end of the upper portion, through the opening in the first bed, and into a cooling oil reservoir of the tank.

10. The dynamometer device according to claim 9, wherein a distal end of the lower portion includes a plurality of oil discharge holes for discharging cooling oil in a plurality of radial directions into the cooling oil reservoir.

11. The dynamometer device according to claim 7, wherein a distal end of the oil discharge pipe includes a plurality of oil discharge holes for discharging cooling oil in a plurality of radial directions into a cooling oil reservoir of the tank.

12. The dynamometer device according to claim 1, wherein the first bed includes a plurality of holes along a peripheral edge thereof for removably attaching the first bed to the second bed through a plurality of fasteners.

13. The dynamometer device according to claim 12, wherein the second bed includes a plurality of holes along a peripheral edge thereof for receiving the plurality of fasteners.

14. The dynamometer device according to claim 13, wherein the peripheral edge of the first bed follows the peripheral edge of the second bed.

15. The dynamometer device according to claim 1, wherein a peripheral edge of the first bed follows a peripheral edge of the second bed.

* * * * *